(12) United States Patent
Jain et al.

(10) Patent No.: US 6,484,185 B1
(45) Date of Patent: Nov. 19, 2002

(54) ATOMIC OPERATIONS ON DATA STRUCTURES

(75) Inventors: Neel Jain, Redmond, WA (US); Bradley Waters, Woodinville, WA (US); Mahlon David Fields, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/286,552

(22) Filed: Apr. 5, 1999

(51) Int. Cl.[7] .............................................. G06F 12/00
(52) U.S. Cl. .............................. 707/203; 707/1; 707/2; 707/8; 707/3; 707/201
(58) Field of Search .............................. 707/1–10, 201, 707/208, 202, 511; 714/52; 711/202; 705/9

(56) References Cited

U.S. PATENT DOCUMENTS

| | | | | |
|---|---|---|---|---|
| 5,327,556 A | * | 7/1994 | Mohan et al. .............. 707/203 |
| 5,452,448 A | * | 9/1995 | Sakuraba et al. ........... 707/201 |
| 5,761,677 A | * | 6/1998 | Senator et al. ............. 707/203 |
| 5,806,078 A | * | 9/1998 | Hug et al. .................. 707/511 |
| 5,918,229 A | * | 6/1999 | Davis et al. ................ 707/10 |
| 5,950,201 A | * | 9/1999 | Van Huben et al. ......... 707/10 |
| 5,956,480 A | * | 9/1999 | Kurihara ..................... 714/52 |
| 5,960,406 A | * | 9/1999 | Rasansky et al. ............. 705/9 |
| 6,009,428 A | * | 12/1999 | Kleewein et al. ............. 707/1 |
| 6,026,474 A | * | 2/2000 | Carter et al. ............... 711/202 |
| 6,067,550 A | * | 5/2000 | Lomet ........................ 707/203 |
| 6,247,027 B1 | * | 6/2001 | Chaudhry et al. .......... 707/206 |

* cited by examiner

Primary Examiner—Kim Vu
Assistant Examiner—Anh Ly
(74) Attorney, Agent, or Firm—Leydig, Voit & Mayer Ltd.

(57) ABSTRACT

Performing atomic operations on data entities having an arbitrary size is disclosed. Version data is associated with a data entity. The version data is saved to a first attribute. The data entity is then accessed. The saved version data is compared to the current version data. If the two are equal, the data entity is valid.

43 Claims, 6 Drawing Sheets

ATOMIC OPERATIONS ON DATA STRUCTURES

FIELD OF THE INVENTION

This invention relates generally to computer systems, and more particularly to performing atomic operations on a data structure.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright 8 1998, 1999, Microsoft Corporation, All Rights Reserved.

BACKGROUND

It is common in today's multiprocessing and multi-threaded computing environments for various executable units running on a computer system to share data by reading and writing data structures residing in shared memory. Sharing data in this manner provides an efficient mechanism for threads to communicate information with one another.

A common problem associated with using data structures in shared memory is managing multiple simultaneous requests to access the data structures and ensuring that accesses to the data are atomic. Guaranteeing atomic access is important because it ensures that the data structure is completely updated before another thread attempts to use the data. As an example, consider a data structure that is 32 bytes long. Without atomic access, one thread may have updated 16 bytes of the data structure when a second thread reads the data structure. The reading thread will read a corrupt version of the data structure, because the first 16 bytes will be new data while the last 16 bytes will be old data.

Atomic access to a data structure can be guaranteed by the hardware when the data structure meets size and alignment restrictions imposed by the particular hardware (typically the size of a machine word or floating point number). Atomic access cannot be guaranteed by the hardware for data structures that do not meet these restrictions. For example, on the Intel IA32 and IA32 compatible architectures, a data structure can only be read atomically by the hardware if it is 64 bits or smaller. In addition, a 64-bit data structure must be aligned on a 64 bit memory boundary and 32 bit data structures must be aligned on a 32 bit memory boundary to be read atomically.

In order to allow for atomic reads of data structures larger than that supported by the hardware, previous systems have provided software mechanisms to guarantee atomic reads of data structures. One such system involves the use of a lock mechanism. In systems using a lock, a thread that requires access to a shared data structure first acquires a lock on the data structure, typically using a function provided by the operating system. The process then updates the data structure. After the data structure is updated, the requesting thread releases the lock. Other threads that require access to the data structure may also attempt to acquire a lock on the data structure. If an attempt occurs while another thread has the data structure locked, the attempt will fail, and the requesting thread will block or wait until the lock becomes available.

Two types of locks are typically provided, exclusive locks and shared locks. An exclusive lock is used by threads that are writing a data structure. The writing thread has exclusive access during the lock period, no other thread may read from or write to the data structure. A shared lock is typically used by a thread that is reading a data structure. A shared lock allows other threads to read the data structure, but does not allow any thread to write to the data structure while the shared lock is in effect.

While software locks allow exclusive and atomic access to data structures, locks are expensive in terms of CPU (Central Processing Unit) and memory resources. The locking mechanisms are routines built around simpler data structures that can be atomically updated via hardware or firmware mechanisms. In addition to the overhead involved in the software used to implement the lock, the accesses to the lock data structures can cause pipeline stalls, poor memory-bus utilization, and cache memory misses. The problems listed above can occur regardless of whether the lock is an exclusive or shared lock. In addition, the problems listed above are compounded when a large number of threads need to access the same shared data structure.

Therefore there is a need in the art for a way to atomically access a data structure that is more efficient than the software lock mechanism used in previous systems.

SUMMARY

The above-mentioned shortcomings, disadvantages and problems are addressed by the present invention, which will be understood by reading and studying the following specification.

The systems and methods presented perform atomic operations on data entities having an arbitrary size. This includes data structures that cannot be atomically read by the hardware. The operations include read and write operations on the data entities.

Version data is associated with the data entities that are operated on. The version data is generated such that no simultaneously executing program units can erroneously determine that two different versions of a data entity are the same.

In one method, a program unit writes, or updates, the data entity. The write program unit acquires exclusive access to the version data associated with a data entity, sets the version data to a predetermined invalid value, and then updates the data entity. The write program unit then updates the version data to a new value and terminates exclusive access to the version data.

In another method, a program unit reads, or accesses, the data entity. The read program unit saves the version data associated with the data entity, reads the data entity, and then compares the current version data to the saved version data. If the current version data is set to a predetermined invalid value, the read program unit determines that a write program unit is in the middle of updating the data entity. This causes the read program unit to restart the attempt to read the data entity.

If the current version data is not equal to the saved version data, the read program unit determines that a write program unit has updated the data entity in the middle of the read program unit's attempt to read the data entity. This also causes the read program unit to restart the attempt to read the data entity.

The systems and methods summarized above, and various other methods for performing atomic operations on data entities will be described in detail in the next section.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, methods of an exemplary embodiment of the invention are provided. Finally, in the fourth section, a conclusion of the detailed description is provided.

HARDWARE AND OPERATING ENVIRONMENT

Figure 1:
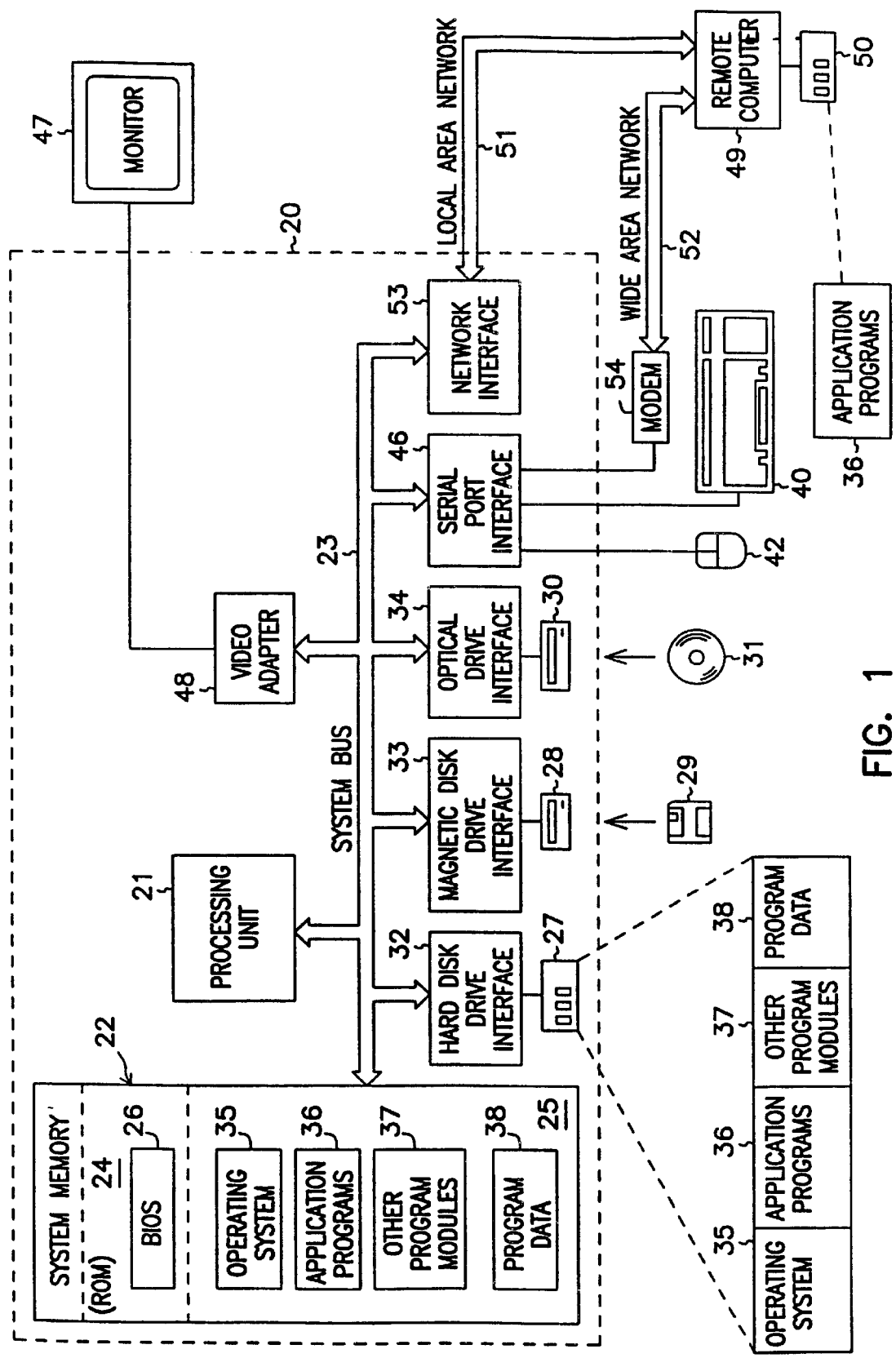
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. a basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

SYSTEM LEVEL OVERVIEW

A system level overview of the operation of an exemplary embodiment of the invention is described by reference to FIG. 2. The concepts of the invention are described as operating in a multiprocessing, multithreaded operating environment on a computer, such as computer 20 in FIG. 1. In this exemplary environment, multiple execution units 205, 220, 225 and 230 require access to a data entity 215.

Data entity 215 is a data structure containing data that is to be shared by multiple program units such as units 205, 220, 225 and 230. Data entity 215 can be any type of data structure known in the art. Examples include arrays, structures, records, strings, integers, floating point numbers, and class objects. Typically data entity 215 will have a size and a memory alignment that will make it incapable of being read atomically by the hardware on which the program units run.

Version data 210 is a version identifier associated with data entity 215. The version data 210 is modified at the beginning and end of all updates to the data entity 215. Version data 210 can be any data type that can be read and updated atomically by the hardware in which the data resides. It is desirable that the version data have a sufficient range of values such that no reading thread could ever confuse two versions. In other words, the value contained in version data 210 must be unique for each version of data entity 215 that exists for concurrently executing program units that access data entity 215.

In one embodiment of the invention, a 32-bit integer data type is used. The value "wraps around" when a maximum value has been reached. However, the invention is not limited 32-bit integer version data, and other data types that can be atomically read and updated can be used for version data 210.

In an embodiment of the invention, a predetermined value for version data 210 is chosen to represent an invalid version value (INVALID_VALUE). In this embodiment, the version data 210 is set to INVALID_VALUE while a program unit is updating data entity 215.

Execution units 205, 220, 225 and 230 are executable program units such as threads that are made up of component modules as described in reference to FIG. 1. Write unit 205 is a program unit that has a component that updates data entity 215. Read units 220, 225, and 230 are program units that have components that read the values comprising data entity 215. Program units 205, 220, 225 and 230 may all be distinct programs, they may be separate instances of the same program, or they may be a combination of the two.

Figure 2:
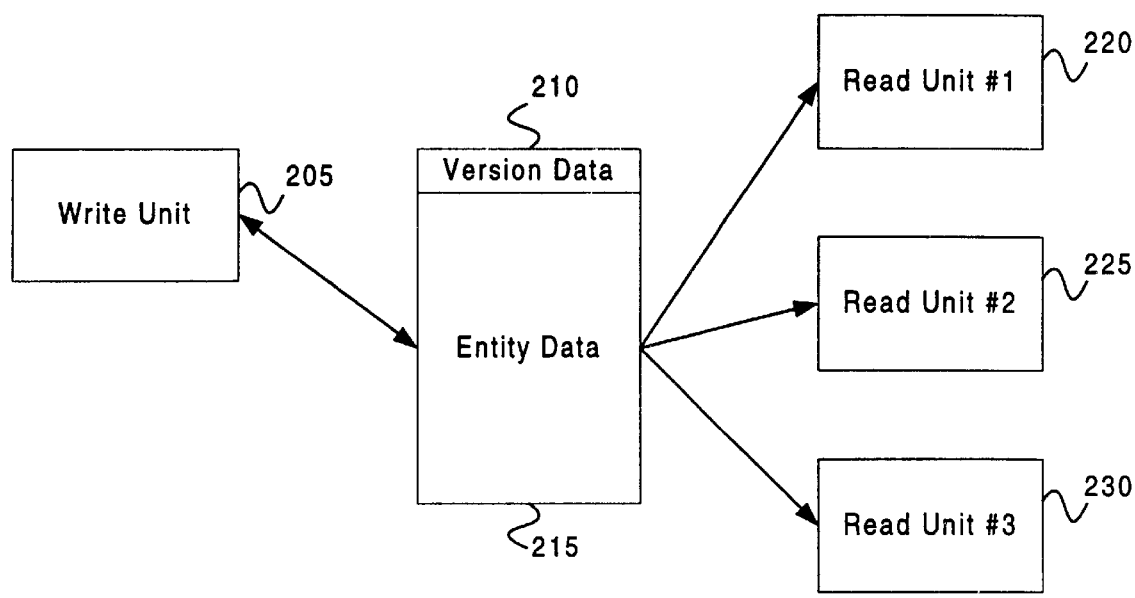
FIG. 2 is a diagram illustrating a system-level overview of an exemplary embodiment of the invention.

FIG. 2 shows a single write unit 205 and three read units 220, 225 and 230 for illustration purposes only. No embodiment of the invention is limited to a particular number of read or write units. In addition, a write unit may require both read and write access to data entity 215, and no embodiment of the invention requires a program unit to perform just one type of access to the data entity.

In operation, the system works as follows. A program unit, such as write unit 205, updates a data entity 215. As part of the update, the write unit 205 acquires exclusive access to version data 210 and, in one embodiment of the invention, sets it to INVALID_VALUE. After the update to the data entity 215 is complete, the write unit 205 modifies version data 210 to indicate a new version of the data in data entity 215 exists. The write unit then terminates exclusive access to version data 210.

One or more program units, such as read units 220, 225 or 230 read data from data entity 215. As part of the read access, the read unit first saves the version data 210 associated with the data entity 215 to a memory location. The read unit then accesses the data entity 215.

Next, the read unit compares the current value of the version data 210 with the previously saved value of version data 210. If the current value is different from the previously saved value, the read unit determines that a write unit has updated the data entity 215 in the middle of the read unit's access to the data. The read unit can then re-access the data entity 215 to get the current value. If the current value is an invalid value, the read unit determines that a write unit is in the middle of an update to the data entity, and the read unit needs to re-access the data entity 215 to get the current value.

The above-described system thus provides advantages not found in previous systems. Unlike previous systems, the read units need not acquire exclusive, or even shared, access to the version data 210 or data entity 215 in order to determine that the data has been updated, it only needs to compare version data associated with a data entity before and after the data entity is accessed. Avoiding acquisition of exclusive or shared access to the version data 210 and data entity 215 during reads of data entity 215 provides a significant reduction in the system resources required to atomically read data, making the system of the invention more efficient and less costly than previous systems. The benefits of the invention are especially significant in environments where there are relatively few write units and many read units.

In one embodiment of the invention, write unit 205 is a web server such as Internet Information Server (IIS) available from Microsoft Corporation. IIS is a server providing Web and directory services and information to client program units. In this embodiment, read units 220, 225 and 230 are client programs to the IIS. These clients include web browsers and other programs desiring web services or directory services.

In an alternative embodiment of the invention, data entity 215 is a date and timestamp data structure maintained by IIS. Typically the structure is updated once per second. Those of skill in the art will appreciate that other data structures and other update intervals can be used.

This section has provided a system-level description of an embodiment of the invention. The next section will present further details on methods of various embodiments of the invention.

METHODS OF AN EXEMPLARY EMBODIMENT OF THE INVENTION

The previous section presented a system level description of an embodiment of the invention. In this section, methods within embodiments of the invention will be described with reference to flowcharts describing tasks to be performed by computer programs implementing the method using computer-executable instructions. The computerized method is desirably realized at least in part as one or more programs running on a computer—that is, as a program executed from a computer-readable medium such as a memory by a processor of a computer. The programs are desirably storable on a computer-readable medium such as a floppy disk, CD-ROM, or Compact Flash (CF) card for distribution, installation and execution on another (suitably equipped) computer. The programs may also be stored on one computer system and transferred to another computer system via a network connecting the two systems, thus at least temporarily existing on a carrier wave or some other form of transmission.

Figure 3:
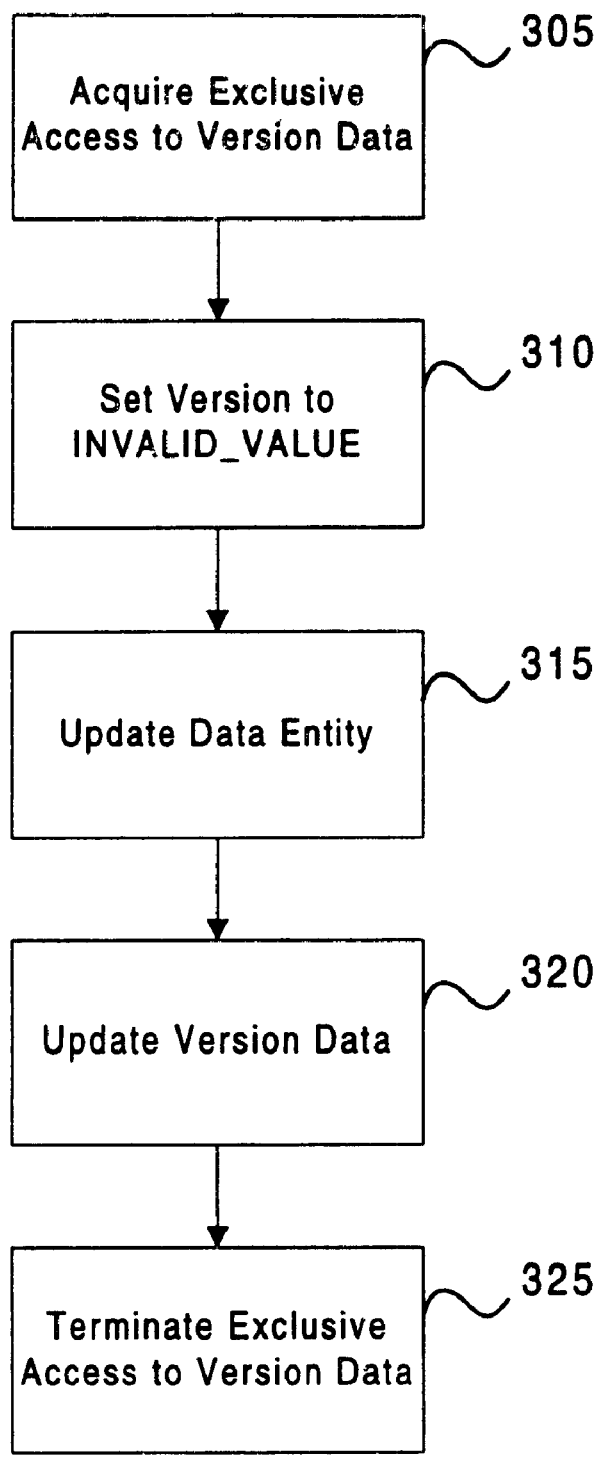
FIG. 3 is a flow diagram illustrating a method for performing an atomic update on a data structure according to one embodiment of the invention.

A method of updating data that is to be read atomically is shown in FIG. 3. In one embodiment of the invention, the method is invoked by a call to a function "UpdateCachedData" with the following C/C++ declaration:

int UpdateCachedData( DataCache *dataCache,
        unsigned__int64 newUserStamp,
        void *newData,
        unsigned__int32 databytes)
where:
    dataCache is a pointer to a data structure such as data entity 215, newUserStamp is a new value for version data 210,
newData is a pointer to a buffer containing new data which is copied into data entity 215 via the dataCache pointer, and
dataBytes is the size of the data structure.

The declaration above has been described using a C/C++ function declaration format, however the invention is not so limited. The methods of the invention can be implemented in any suitable programming language, as those skilled in the art will appreciate.

The method begins by acquiring exclusive rights to access the version data 210 associated with the data entity that is to be updated (block 305). The exclusive rights can be acquired using any of a number of mechanisms, the choice of a particular mechanism will be determined by the operating system in which the methods of the invention are implemented. In one embodiment of the invention, exclusive access is acquired using an exclusive lock mechanism. The lock mechanism may be provided by the operating system, by an application, or it may be implemented within the hardware or firmware of the computer. In an alternative embodiment of the invention, exclusive access is acquired using what is known in the art as a critical section of code. Those of skill in the art will recognize that other mechanisms may be used to acquire exclusive access to the version data.

In one embodiment of the invention, the version data is set to a predetermined value (INVALID_VALUE) used to indicate that the version data is currently not valid (block 310). The desirability of using such an INVALID_VALUE will be described below in reference to FIG. 4.

The method then updates the data entity 215 (block 315). Unlike the update to the version data, the update to data entity 215 need not be atomic. That is, it may take a number of CPU operations to accomplish the update.

After updating data entity 215, the method then updates the version data 210. The version data 210 is set to a value that differs from the value when the method started (block 320). In one embodiment of the invention, the version data is incremented. In an alternative embodiment of the invention, the new value for the version data is a timestamp that can be atomically updated. Those of skill in the art will appreciate that any method of generating a version number that guarantees not to repeat within a reasonable period of time and that does not generate the value representing INVALID_VALUE can be used to generate a version identifier. For example, a pseudo-random number generator that does not generate repeated numbers could be used to generate version identifiers The method then terminates exclusive access rights to the version data 210 (block 325). In one embodiment of the invention, the exclusive access is terminated by releasing the lock acquired on the version data. In an alternative embodiment of the invention, the exclusive access is terminated by leaving a critical section of code.

Figure 4:
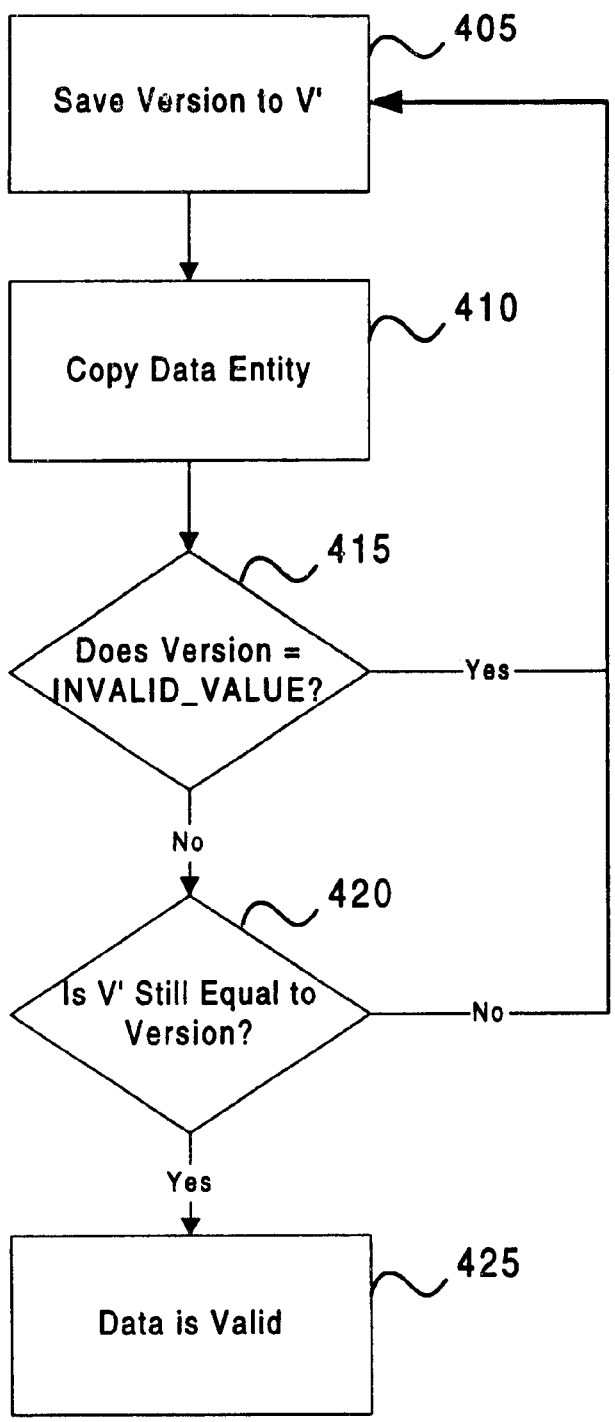
FIG. 4 is a flow diagram illustrating a method for performing an atomic read from a data structure according to an embodiment of the invention.

A method of atomically reading a data entity such as data entity 215 is shown in FIG. 4. In one embodiment of the invention, the method is invoked by a call to a "ReadCachedData" function having the following C/C++ declaration:

int ReadCachedData( DataCache *dataCache,
        void *buffer,
        unsigned__int32 dataBytes,
        unsigned__int64 *userStampFromRead)
where:
    dataCache is a pointer to the data that is to be read (i.e. data entity 215),
    buffer is a pointer to a buffer to receive a copy of the data that is read, dataBytes is the number of bytes in the buffer to copy, and userStampFromRead is a pointer to the version data (such as version data 210) associated with the data structure in dataCache.

The method begins by saving a copy of the current version data associated with the data entity that is to be read to a temporary variable or data location (block 405). The temporary variable will be referred to as V'. It is desirable to copy the current version data, because a later write access by another thread may update the version data. In one embodiment of the invention, if the current version data is set to INVALID_VALUE, the method is restarted. In a further embodiment of the invention, the method employs a delaying or waiting mechanism before restarting the method. Using such a mechanism is desirable, because it allows a writing thread to finish updating the data entity 215.

The method then reads a desired data entity such as data entity 215 and copies the data to a user-specified location in memory (block 410). Again, it is desirable that the data is copied, because a later write access by another thread may update the data entity. However, no embodiment of the invention is limited to making a copy of the data entity 215, and the data entity may be directly accessed.

Next, in one embodiment of the invention, the method compares the current value of the version data to the predetermined INVALID_VALUE (block 415). If the current version data is invalid, it is because another thread is currently updating the data entity 215. In this case, the method retries the read by returning to block 405 and starting the method again. In one embodiment of the invention where updates to the data entity may take a comparatively long time, the method waits for a predetermined amount of time before restarting.

If the current version is not the predetermined INVALID_VALUE, then the method compares the current version data to the saved version data (block 420). If the current and saved version data are different, it is because a write thread has updated the data entity 215 in between the time the read thread started to read the data for data entity 215 and when the read thread finished reading the data. In this case, the method retries the read by returning to block 405 to save what is now the new version data 210.

If the current version is not the predetermined INVALID_VALUE and the current version data is the same as the saved version data in V', the method indicates to the reading thread that the data entity is valid and the method terminates (block 425).

The methods described above in reference to FIGS. 4 and 5 are applicable to architectures that are strongly ordered. A strongly ordered architecture is one in which operations are performed, or, from the perspective of the software program, appear to have been performed, in the same order as the program specifies. An example of such an architecture is the IA32 architecture used on certain processors from Intel Corporation.

In a strongly ordered architecture, the fact that the update method changes the version data before and after updating the data entity guarantees that the read method will notice the update to the version data if it reads the version data during an update by the write method.

Even if the architecture is strongly ordered, it is possible that compiler optimizations may be applied that cause instructions to be re-ordered. In this case, it is desirable to inform the compiler not to reorder operations on the version data 210. In one embodiment of the invention implemented in the C/C++ environment, this is accomplished by declaring the attribute containing the version data to be "volatile." In an alternative embodiment of the invention, compiler optimizations are disabled for the section of code that implements the method.

Figure 5:
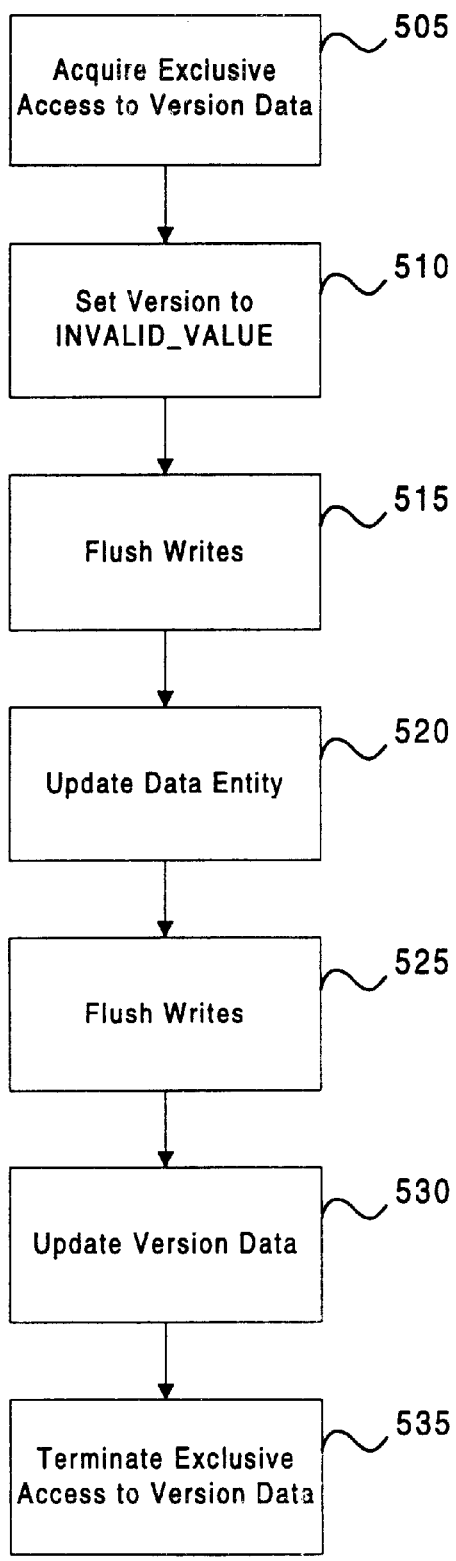
FIG. 5 is a flow diagram illustrating a method for performing an atomic update on a data structure according to an alternative embodiment of the invention for architectures that are not strongly ordered.
Figure 6:
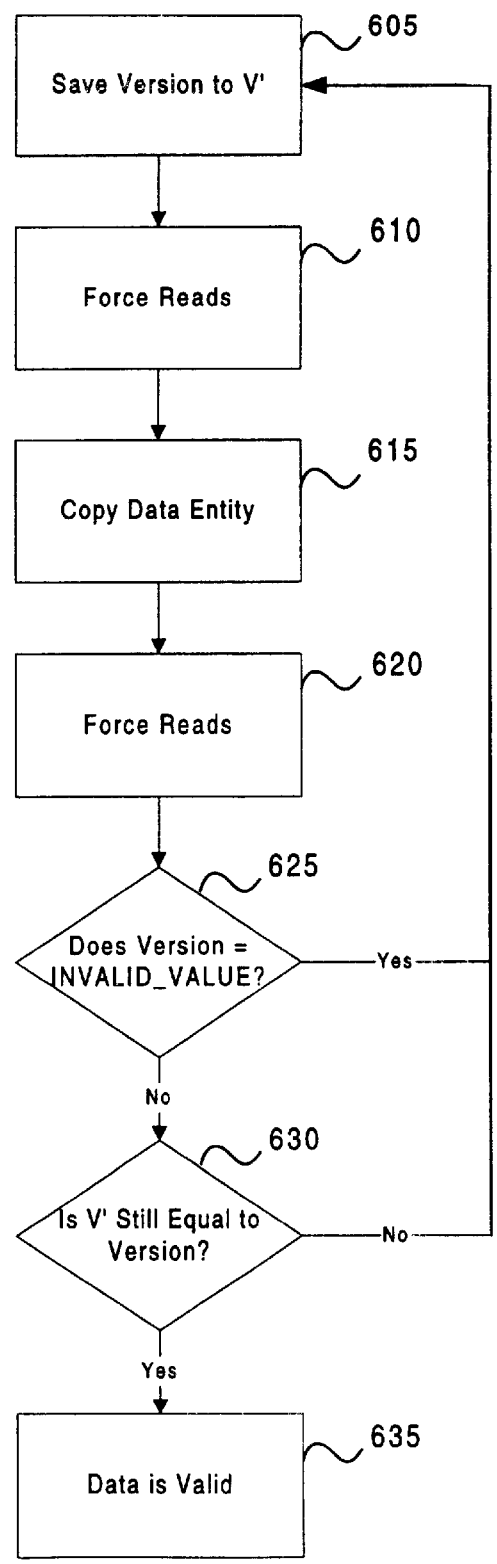
FIG. 6 is a flow diagram illustrating a method for performing an atomic read from a data structure according to an alternative embodiment of the invention for architectures that are not strongly ordered.

FIGS. 5 and 6 describe a method of updating and atomically reading a data structure in architectures that are not strongly ordered. In these architectures, operations may be performed in a slightly different order than that specified in the program code. Typically, the reason for the out of order execution is due to hardware or firmware implemented optimizations, or due to the pipeline architecture of the processor or processors executing the program. An example of such an architecture is the Alpha processor, developed by Digital Equipment Corporation.

FIG. 5 illustrates a method according to an alternative embodiment that updates a data entity in a manner allowing it to be read atomically by program units. The method illustrated in FIG. 5 is similar to the method illustrated in FIG. 3 with modifications to account for possible out of order execution of certain computer instructions used to implement the method.

The method begins by acquiring exclusive access to the version data 210 associated with a data entity 215 (block 505). As described above, various embodiments of the invention may use exclusive locks, critical sections, or other mechanisms known in the art for acquiring exclusive access to data.

Next, in one embodiment, the method sets the version data to a predetermined invalid value (block 510). This is followed by causing the processor to flush writes (block 515). This causes pending writes in the processor's pipeline to be committed to memory. It is desirable to flush writes at this point, because it guarantees that read units accessing data entity 215 using the method of the invention will notice the change to the version data. In an alternative embodiment of the invention, a memory barrier, as is known in the art, is used to guarantee that other threads reading the version data will receive the correct data, that is, the reading thread will see the change of the version data to the predetermined invalid value.

After writes are flushed at block 515, the thread then updates data entity 215 (block 520). This is followed by another flush of pending writes (block 525).

Next, the version data 210 is updated to a new value indicating that a new value for data entity 215 has been established (block 530). The method then terminates exclusive access to the version data as described above in reference to FIG. 3 (block 535).

FIG. 6 illustrates a method for atomically reading a data entity according to an alternative embodiment of the invention that operates in a non-strongly ordered environment. The method is similar to the method described above in reference to FIG. 4, with adjustments made where desirable to ensure that updates to significant data are seen by all relevant program units.

The method begins by saving current version data, such as version data 210, associated with a data entity 215 (block 605). In one embodiment of the invention, if the current version data is set to INVALID_VALUE, the method is restarted. In a further embodiment of the invention, the method employs a delaying or waiting mechanism before restarting the method. Using such a mechanism is desirable, because it allows a writing thread to finish updating the data entity 215.

Next, the method forces read order (block 610). Maintaining read order is desirable so that all updates to the version data are reflected in the saved version data. In one embodiment of the invention, read ordering is forced by clearing the current instruction or data pipeline. In an alternative embodiment of the invention, memory barriers are used to order reads.

The method then copies the data entity 215 (block 615). As discussed above in reference to FIG. 4, it is desirable that the data is copied, because a later write access by another thread may update the data entity. However, no embodiment of the invention is limited to making a copy of the data entity 215, and the data entity may be directly accessed.

Next, pending reads are ordered (block 620). This ensures that all updates to the data entity 215 are copied. As discussed above, the instruction or data pipeline is flushed in one embodiment of the invention. In an alternative embodiment, memory barriers are used to order reads.

In one embodiment of the invention, the method then compares the current value of the version data to the predetermined INVALID_VALUE (block 625). It is desirable to include this comparison in order to detect that another thread is currently updating the data entity 215. In this case, the method retries the read by returning to block 605 and starting the method again. In one embodiment of the invention where updates to the data entity may take a comparatively long time, the method waits for a predetermined amount of time before restarting.

If the current version is not the predetermined INVALID_VALUE, then the method compares the current version data to the saved version data (block 630). If the current and saved version data are different, it is because a write thread has updated the data entity 215 in between the time the read thread started to read the data for data entity 215 and when the read thread finished reading the data. In this case, the method retries the read by returning to block 605 to save what is now the new version data 210.

If the current version is not the predetermined INVALID_VALUE and the current version data is the same as the saved version data in V', the method indicates to the reading thread that the data entity is valid and the method terminates (block 635).

CONCLUSION

The particular systems and methods implementing atomic operations on a data entity having an arbitrary size have been described. The methods provide an efficient mechanism for performing atomic operations on data entities.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, various embodiments have been described as operating in a multiprocessing environment. This environment includes both systems in which a single processor manages multiple threads simultaneously, where multiple processors are connected via a bus, and where multiple systems are coupled via a wired or wireless network.

In addition, the term "thread" has been used in the description of various embodiments of the invention. A thread, as is known in the art, is a schedulable, executable program unit. However, the invention is not limited to threads, and other executable units such as processes or tasks may be included instead of, or in addition to threads.

The terminology used in this application with respect to is meant to include all of these environments. Therefore, it is manifestly intended that this invention be limited only by the following claims and equivalents thereof.

What is claimed is:

1. A computerized method for performing one or more atomic operations on a data entity of arbitrary size and characterized by version data, the method comprising the following steps:

in a first thread of execution:
      acquiring exclusive access to the version data;
      setting the version data to a first value indicating that the data entity is invalid and not accessible by other operations;
      modifying the data entity;
      updating the version data to a second value indicating that the data entity is valid and accessible; and
      terminating exclusive access to the version data;
   in a second thread of execution, the second thread executing concurrently with the first thread of execution:
      (a) reading the first value of the version data;
      (b) if the first value is determined to be an invalid value, repeating steps (a) and (b); and
      (c) upon completion of step (b), reading the data entity.

2. The computerized method of claim 1, wherein acquiring exclusive access to the version data comprises acquiring a lock on the version data and wherein terminating exclusive access to the version data releases the lock.

3. The computerized method of claim 2, wherein the lock is identified by the version data.

4. The computerized method of claim 1, further comprising setting the version data to a predetermined invalid value after acquiring the lock on the version data.

5. The computerized method of claim 4, further comprising flushing writes after setting the version data to a predetermined invalid value.

6. The computerized method of claim 1, further comprising flushing writes after updating the data entity.

7. The computerized method of claim 1, further comprising:
   (d) upon completion of step (c), reading the second value of the version data;
   (e) if the first value does not match the second value, repeating steps (a), (b), (c), (d) and (e).

8. The method of claim 1, wherein the first thread of execution is executed by one or more read units.

9. The method of claim 1, wherein the second thread of execution is executed by one or more write units.

10. The method of claim 9, wherein at least one of the write units is a web server.

11. The method of claim 1, wherein the data entity is stored in a memory that is accessible by both the first and second threads of execution.

12. The method of claim 1, wherein the updating step comprises incrementing the version data.

13. The method of claim 1, wherein the version data comprises a timestamp, and the updating step comprises updating the timestamp.

14. The method of claim 1, wherein the data entity comprises a timestamp.

15. The method of claim 1, wherein the data entity comprises a date.

16. The method of claim 15, wherein the data entity further comprises a timestamp.

17. The method of claim 1, wherein the setting step comprises setting the version data to a value that has been predetermined to represent an invalid version.

18. The method of claim 1, further comprising choosing a predetermined value to represent an invalid version.

19. The method of claim 1, further comprising:
in the second thread of execution,
saving the first value of the version data;
reading a second value of the version data; and
comparing the first value and the second value, wherein step (b) is performed based on the comparing step.

20. The method of claim 1, wherein the step of reading the first value of the version data is performed during the modifying step.

21. The method of claim 1, wherein the step of reading the first value of the version data is performed prior to the updating step.

22. The method of claim 1, wherein the first thread of execution is executed by one or more read units.

23. A computer-readable medium: having computer-executable instructions to cause a computer to perform a method for performing one or more atomic operations on a data entity of arbitrary size and characterized by version data, the method comprising the following steps:
in a first thread of execution:
acquiring exclusive access to the version data;
setting the version data to a first value indicating that the data entity is invalid and not accessible by other operations;
modifying the data entity;
updating the version data to a second value indicating that the data entity is valid and accessible; and
terminating exclusive access to the version data;
in a second thread of execution, the second thread executing concurrently with the first thread of execution:
(a) reading the first value of the version data;
(b) if the first value is determined to be an invalid value, repeating steps (a) and (b); and
(c) upon completion of step (b), reading the data entity.

24. The computer-readable medium of claim 23, wherein acquiring exclusive access to the version data comprises acquiring a lock on the version data and wherein terminating exclusive access to the version data releases the lock.

25. The computer-readable medium of claim 24, wherein the lock is identified by the version data.

26. The computer-readable medium of claim 23, further comprising setting the version data to a predetermined invalid value after acquiring the lock on the version data.

27. The computer-readable medium of claim 26, further comprising flushing writes after setting the version data to a predetermined invalid value.

28. The computer-readable medium of claim 23, further comprising flushing writes after updating the data entity.

29. The computer-readable medium of claim 23, wherein the method further comprises:
(d) upon completion of step (c), reading the second value of the version data;
(e) if the first value does not match the second value, repeating steps (a), (b), (c), (d) and (e).

30. A computerized method for performing one or more atomic operations on a data entity of arbitrary size and characterized by version data, the method comprising the following steps:
in a first thread of execution:
acquiring exclusive access to the version data;
setting the version data to a first value indicating that the data entity is invalid and not accessible by other operations;
modifying the data entity;
updating the version data to a second value indicating that the data entity is valid and accessible; and
terminating exclusive access to the version data;
in a second thread of execution, the second thread executing concurrently with the first thread of execution:
(a) reading the first value of the version data;
(b) upon completion of step (a), reading the data entity;
(c) upon completion of step (b), reading the second value of the version data;
(d) if the first value is different from the second value, or if the first value is invalid, repeating steps (a), (b), (c) and (d).

31. The method of claim 30, wherein the second thread of execution is executed by one or more write units.

32. The method of claim 31, wherein at least one of the write units is a web server.

33. The method of claim 30, wherein the data entity is stored in a memory that is accessible by both the first and second threads of execution.

34. The method of claim 30, wherein the updating step comprises incrementing the version data.

35. The method of claim 30, wherein the version data comprises a timestamp, and the updating step comprises updating the timestamp.

36. The method of claim 30, wherein the data entity comprises a timestamp.

37. The method of claim 30, wherein the data entity comprises a date.

38. The method of claim 37, wherein the data entity further comprises a timestamp.

39. The method of claim 30, wherein the setting step comprises setting the version data to a value that has been predetermined to represent an invalid version.

40. The method of claim 30, further comprising choosing a predetermined value to represent an invalid version.

41. The method of claim 30, wherein the step of reading the first value of the version data is performed during the modifying step.

42. The method of claim 30, wherein the step of reading the first value of the version data is performed prior to the updating step.

43. A computer-readable medium having computer-executable instructions to cause a computer to perform a method for performing one or more atomic operations on a data entity of arbitrary size and characterized by version data, the method comprising the following steps:
in a first thread of execution:
acquiring exclusive access to the version data;
setting the version data to a first value indicating that the data entity is invalid and not accessible by other operations;
modifying the data entity;
updating the version data to a second value indicating that the data entity is valid and accessible; and
terminating exclusive access to the version data;
in a second thread of execution, the second thread executing concurrently with the first thread of execution:
(a) reading the first value of the version data;
(b) upon completion of step (a), reading the data entity;
(c) upon completion of step (b), reading the second value of the version data;
(d) if the first value is different from the second value, or if the first value is invalid, repeating steps (a), (b), (c) and (d).

* * * * *